(12) United States Patent
Matsumoto et al.

(10) Patent No.: US 12,803,279 B2
(45) Date of Patent: Nov. 17, 2026

US012803279B2

(54) ISOLATED POWER GRID MANAGEMENT DEVICE AND ISOLATED POWER GRID SYSTEM

(71) Applicant: Mitsubishi Electric Corporation, Tokyo (JP)

(72) Inventors: Koki Matsumoto, Tokyo (JP); Sadayuki Inoue, Tokyo (JP); Rutvikanandan Manohar, Tokyo (JP); Keishi Matsuda, Tokyo (JP); Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/145,955

(22) PCT Filed: Feb. 21, 2023

(86) PCT No.: PCT/JP2023/006158
§ 371 (c)(1),
(2) Date: Jul. 7, 2025

(87) PCT Pub. No.: WO2024/176331
PCT Pub. Date: Aug. 29, 2024

(65) Prior Publication Data
US 2026/0221767 A1 Jul. 30, 2026

(51) Int. Cl.
*H02J 3/001* (2026.01)
*H02J 3/007* (2026.01)
*H02J 3/388* (2026.01)

(52) U.S. Cl.
CPC .............. *H02J 3/001* (2020.01); *H02J 3/007* (2020.01); *H02J 3/388* (2020.01)

(58) Field of Classification Search
CPC .. H02J 3/001; H02J 3/007; H02J 3/388; H02J 3/38; H02J 3/381; H02J 3/472
See application file for complete search history.

(56) References Cited

U.S. PATENT DOCUMENTS

2012/0080942 A1* 4/2012 Carralero ................ H02J 13/12 307/24
2015/0200543 A1* 7/2015 Nielsen ................... F03D 7/048 307/87

FOREIGN PATENT DOCUMENTS

CN 110266044 A * 9/2019 ................ H02J 3/01
CN 110707759 A * 1/2020 ................ H02J 3/46
(Continued)

OTHER PUBLICATIONS

International Search Report and Written Opinion mailed on May 9, 2023, received for PCT Application PCT/JP2023/006158, filed on Feb. 21, 2023, 8 pages including English Translation.
(Continued)

*Primary Examiner* — Rexford N Barnie
*Assistant Examiner* — Rasem Mourad
(74) *Attorney, Agent, or Firm* — XSENSUS LLP

(57) ABSTRACT

An isolated power grid management device includes: a turn-on sequence determination unit to determine a turn-on sequence of a plurality of section switches in recovery of an isolated power grid from a power failure state; and a turn-on command unit to provide a turn-on command to the plurality of section switches in accordance with a sequence determined by the turn-on sequence determination unit. When there is a power transmission and distribution section to which a voltage is newly applied by turning on a section switch of section switches yet to be turned on, the turn-on sequence determination unit determines a turn-on priority order of the section switch based on a total capacity value of a group of transformers included in the power transmission and distribution section and information on a total capacity value of a voltage power supply that has already been electrically connected to the section switch.

8 Claims, 6 Drawing Sheets

(56) References Cited

FOREIGN PATENT DOCUMENTS

| | | | | |
|---|---|---|---|---|
| JP | 2006-060885 | A | | 3/2006 |
| JP | 2006-121846 | A | | 5/2006 |
| JP | 2013172571 | A | * | 9/2013 |
| JP | 2015-165753 | A | | 9/2015 |
| JP | 2017-200409 | A | | 11/2017 |

OTHER PUBLICATIONS

Office Action mailed on Mar. 21, 2025, received for TW Application 113103919, 13 pages including English Translation.

* cited by examiner

FIG.4

(A)

| SWITCH No. | STATE |
|---|---|
| 107a | NORMAL TURN-ON CANDIDATE |
| 107b | NORMAL TURN-ON CANDIDATE |
| 107c | NORMAL TURN-ON CANDIDATE |
| 108a | |
| 108b | |
| 108c | |
| 108d | |
| 108e | |
| 108f | |

(B)

| SWITCH No. | STATE |
|---|---|
| 107a | NORMAL TURN-ON CANDIDATE |
| 107b | ADDED |
| 107c | NORMAL TURN-ON CANDIDATE |
| 108a | |
| 108b | |
| 108c | NORMAL TURN-ON CANDIDATE |
| 108d | |
| 108e | |
| 108f | |

(C)

| SWITCH No. | STATE |
|---|---|
| 107a | NORMAL TURN-ON CANDIDATE |
| 107b | ADDED |
| 107c | NORMAL TURN-ON CANDIDATE |
| 108a | |
| 108b | NORMAL TURN-ON CANDIDATE |
| 108c | ADDED |
| 108d | |
| 108e | |
| 108f | NORMAL TURN-ON CANDIDATE |

(D)

| SWITCH No. | STATE |
|---|---|
| 107a | NORMAL TURN-ON CANDIDATE |
| 107b | ADDED |
| 107c | SYNCHRONOUS TURN-ON ENABLED |
| 108a | |
| 108b | NORMAL TURN-ON CANDIDATE |
| 108c | ADDED |
| 108d | |
| 108e | |
| 108f | ADDED |

(E)

| SWITCH No. | STATE |
|---|---|
| 107a | NORMAL TURN-ON CANDIDATE |
| 107b | ADDED |
| 107c | ADDED |
| 108a | |
| 108b | NORMAL TURN-ON CANDIDATE |
| 108c | ADDED |
| 108d | |
| 108e | |
| 108f | ADDED |

(F)

| SWITCH No. | STATE |
|---|---|
| 107a | NORMAL TURN-ON CANDIDATE |
| 107b | ADDED |
| 107c | ADDED |
| 108a | NORMAL TURN-ON CANDIDATE |
| 108b | ADDED |
| 108c | ADDED |
| 108d | |
| 108e | |
| 108f | ADDED |

FIG.5

(A)

| SWITCH No. | STATE |
|---|---|
| 107a | SYNCHRONOUS TURN-ON ENABLED |
| 107b | ADDED |
| 107c | ADDED |
| 108a | ADDED |
| 108b | ADDED |
| 108c | ADDED |
| 108d | |
| 108e | |
| 108f | ADDED |

(B)

| SWITCH No. | STATE |
|---|---|
| 107a | ADDED |
| 107b | ADDED |
| 107c | ADDED |
| 108a | ADDED |
| 108b | ADDED |
| 108c | ADDED |
| 108d | |
| 108e | NORMAL TURN-ON CANDIDATE |
| 108f | ADDED |

(C)

| SWITCH No. | STATE |
|---|---|
| 107a | ADDED |
| 107b | ADDED |
| 107c | ADDED |
| 108a | ADDED |
| 108b | ADDED |
| 108c | ADDED |
| 108d | NORMAL TURN-ON CANDIDATE |
| 108e | ADDED |
| 108f | ADDED |

(D)

| SWITCH No. | STATE |
|---|---|
| 107a | ADDED |
| 107b | ADDED |
| 107c | ADDED |
| 108a | ADDED |
| 108b | ADDED |
| 108c | ADDED |
| 108d | ADDED |
| 108e | ADDED |
| 108f | ADDED |

FIG.6

| TURN-ON SEQUENCE | SWITCH No. | TURN-ON TYPE |
|---|---|---|
| 1 | 107b | NORMAL TURN-ON |
| 2 | 108c | NORMAL TURN-ON |
| 3 | 108f | NORMAL TURN-ON |
| 4 | 107c | SYNCHRONOUS TURN-ON |
| 5 | 108b | NORMAL TURN-ON |
| 6 | 108a | NORMAL TURN-ON |
| 7 | 107a | SYNCHRONOUS TURN-ON |
| 8 | 108e | NORMAL TURN-ON |
| 9 | 108d | NORMAL TURN-ON |

ISOLATED POWER GRID MANAGEMENT DEVICE AND ISOLATED POWER GRID SYSTEM

CROSS-REFERENCE TO RELATED APPLICATION

This application is a national stage application, pursuant to 35 U.S.C. § 371, of International Patent Application No. PCT/JP2023/006158, filed Feb. 21, 2023, the entire contents of which is incorporated herein by reference.

TECHNICAL FIELD

The present disclosure relates to an isolated power grid management device that manages an operation state of a power grid operated independently, and to an isolated power grid system including the device.

BACKGROUND ART

In order to continue electric power supply to each consumer if a disaster causes a power network to become isolated from a main grid in some areas or if a large-scale power failure occurs in the main grid, local microgrids are attracting attention. Such local microgrids temporarily isolate a specific area from the main grid and utilize local solar power generation facilities, wind power generation facilities, storage batteries for grids, emergency generators, or the like to construct and operate an isolated power grid.

When starting operation of the isolated power grid, it is necessary to start up each power supply within the power grid from a power failure state to a state in which the system voltage is distributed throughout the area. At this time, it is assumed that the same facility as that used in normal operation will be used for the power transmission and distribution network, but in general, section switches are installed in the power transmission and distribution network at regular intervals, and the section to which the supply voltage from the power supply is applied is controlled by opening and closing such a section switch. In start-up from the power failure state, thus, it is assumed that the section switches will be sequentially turned on from a section switch closest to the power supply after activating the power supply, thereby expanding the power supply area. In this respect, PTL 1 describes the technology related to the procedure and control method for starting up an isolated power grid.

CITATION LIST

Patent Literature

PTL 1: Japanese Patent Laying-Open No. 2006-121846

SUMMARY OF INVENTION

Technical Problem

When an isolated power grid is started up from a power failure state, the voltage power supply that serves to maintain the system voltage is activated, and then, the power supply and distribution sections divided by the section switches arranged in the power transmission and distribution network are sequentially turned on, thereby expanding the power supply area.

In this case, it is known that immediately after the section switch is turned on, an exciting inrush current of as much as about several to ten times the self-rated current flows into each of the plurality of pole transformers included in a newly turned-on section. The voltage power supply supplies the total value of the exciting inrush currents. At this time, particularly when an inverter-type power supply is used as the voltage power supply, the withstand overcurrent may be smaller than that of a rotating machine power supply, and accordingly, a power failure may occur again due to activation of the protective shutdown function for overcurrent, or the voltage may drop due to activation of the current suppression control provided in the inverter-type power supply, thus adversely affecting a customer by supplying a voltage that deviates from the quality standard.

The present disclosure has been made to solve the above-described problem. An object of the present disclosure is to provide an isolated power grid management device and an isolated power grid system that can prevent shutdown of protection of a power supply and an excessive drop in system voltage due to an exciting inrush current flowing to a transformer that occurs when a section switch is turned on.

Solution to Problem

An isolated power grid management device according to an embodiment manages an operation state of an isolated power grid disconnected from a main power grid and operated independently. The isolated power grid includes one or more voltage power supplies to function to maintain a system voltage, and a plurality of section switches to determine a connection state with a power transmission and distribution network and divide the power transmission and distribution network, the power transmission and distribution network forming a network electrically connecting the voltage power supply to each consumer. The isolated power grid management device includes: a turn-on sequence determination unit to determine, based on path information of the power transmission and distribution network, capacity information of a transformer included in each power transmission and distribution section, and capacity information of each voltage power supply, a turn-on sequence of the plurality of section switches in recovery of the isolated power grid from a power failure state; and a turn-on command unit to provide a turn-on command to the plurality of section switches in accordance with a sequence determined by the turn-on sequence determination unit. When there is a power transmission and distribution section to which a voltage is newly applied by turning on a section switch of section switches yet to be turned on, the turn-on sequence determination unit determines a turn-on priority order of the section switch based on a total capacity value of a group of transformers included in the power transmission and distribution section and information on a total capacity value of a voltage power supply that has already been electrically connected to the section switch.

An isolated power grid system according to an embodiment includes an isolated power grid disconnected from a main power grid and operated independently, and an isolated power grid management device to manage an operation state of the isolated power grid. The isolated power grid system includes one or more voltage power supplies to function to maintain a system voltage, and a plurality of section switches to determine a connection state with a power transmission and distribution network and divide the power transmission and distribution network, the power transmission and distribution network forming a network electrically connecting the voltage power supply to each consumer. The isolated power grid management device includes: a turn-on sequence determination unit to determine, based on path information of the power transmission and distribution network, capacity information of a transformer included in each power transmission and distribution section, and capacity information of each voltage power supply, a turn-on sequence of the plurality of section switches in recovery of the isolated power grid from a power failure state; and a turn-on command unit to provide a turn-on command to the plurality of section switches in accordance with a sequence determined by the turn-on sequence determination unit. When there is a power transmission and distribution section to which a voltage is newly applied by turning on a section switch of section switches yet to be turned on, the turn-on sequence determination unit determines a turn-on priority order of the section switch based on a total capacity value of a group of transformers included in the power transmission and distribution section and information on a total capacity value of a voltage power supply that has already been electrically connected to the section switch.

Advantageous Effects of Invention

The isolated power grid management device and the isolated power grid system according to the present disclosure can prevent shutdown of protection of a power supply and an excessive drop in system voltage due to an exciting inrush current flowing to a transformer that occurs when a section switch is turned on.

BRIEF DESCRIPTION OF DRAWINGS

FIG. 4 is a diagram (1) illustrating a flow of determining a turn-on sequence by turn-on sequence determination unit 202 according to the embodiment.

FIG. 5 is a diagram (2) illustrating a flow of determining a turn-on sequence by turn-on sequence determination unit 202 according to the embodiment.

FIG. 6 illustrates an example turn-on sequence table according to the embodiment.

DESCRIPTION OF EMBODIMENTS

Embodiment 1

Figure 1:
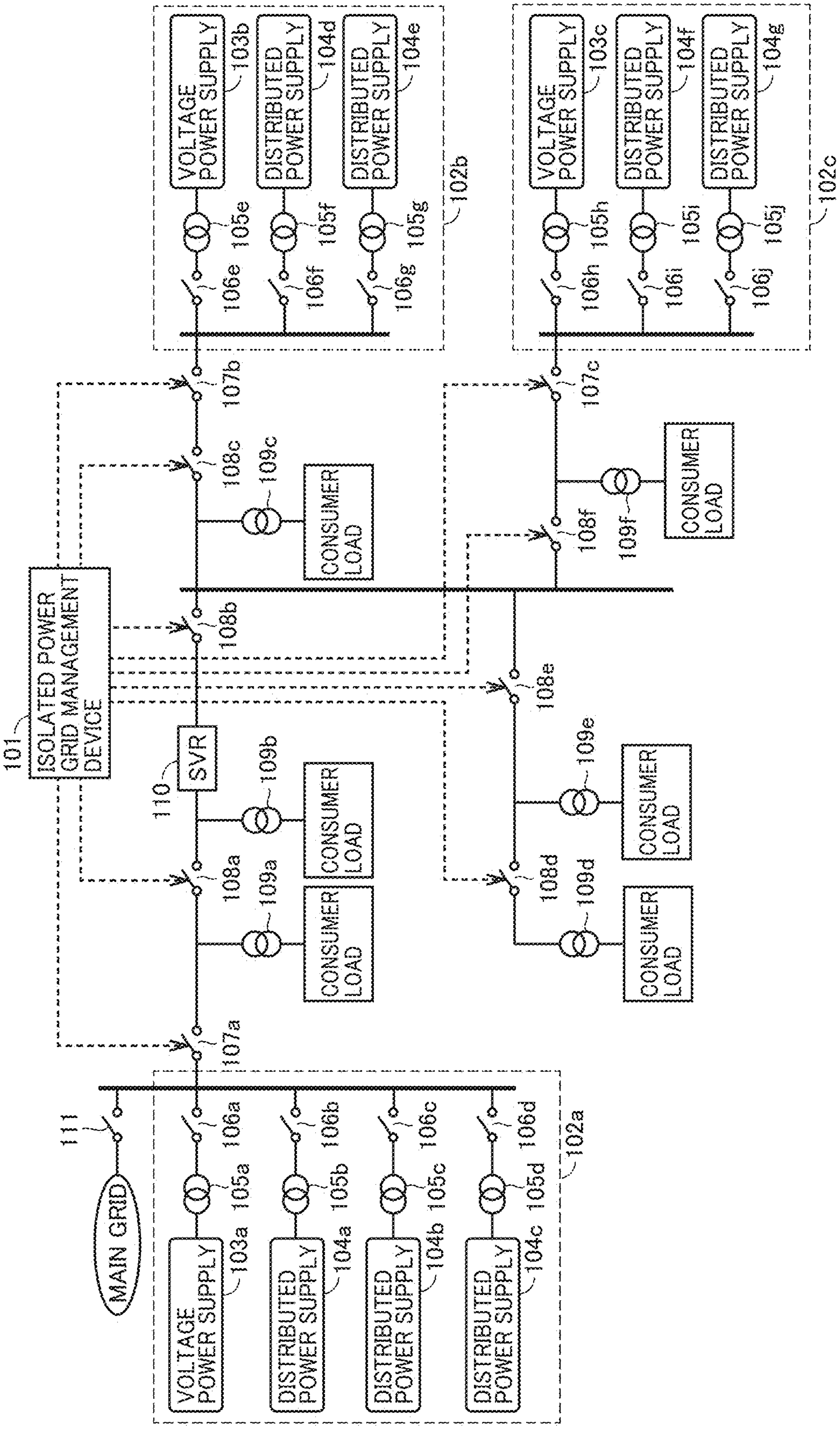
FIG. 1 shows an overall configuration of an isolated power grid managed by an isolated power grid management device according to an embodiment.

FIG. 1 shows an overall configuration of an isolated power grid managed by an isolated power grid management device according to an embodiment.

Referring to FIG. 1, the components and operations of the isolated power grid will be described.

An isolated power grid management device 101 is a device that collects information on the operation state of the isolated power grid, performs necessary calculation processing, and transmits a command to each component in order to manage the operation state of the isolated power grid. A configuration and an operation will be described later in detail.

Power generation and transformation facilities 102*a* to 102*c* (hereinafter, also collectively referred to as power generation and transformation facility 102) are facilities that have power supplies that supply electric power to the isolated power grid, and these are connected to one another via a power transmission and distribution network. Power generation and transformation facility 102 may be a transformer facility, a mega solar facility, a wind power station, or a storage battery facility.

Voltage power supplies 103*a* to 103*c* (hereinafter, also collectively referred to as voltage source power supply 103) are power supplies that have the ability to maintain a system voltage, and may be rotary machine generators, or a combination of a power conversion device that implements control to maintain an alternating-current (AC) system voltage and a direct-current (DC) power supply. The DC power supply may be a storage battery, a solar power generation panel, or a rectified output from a wind turbine generator. In the configuration according to Embodiment 1, there is at least one voltage power supply in the isolated power grid, and any number of (which should be one or more) voltage power supplies may be used. When there are two or more voltage power supplies, a function to synchronize the voltage phases of a plurality of voltage power supplies is required, and this function may be realized by the oscillation characteristics of a rotary generator, or may be realized by a power converter that implements, in a simulated manner, the operation characteristics similar to the oscillation characteristics of the rotary generator.

Distributed power supplies 104*a* to 104*g* (hereinafter, also collectively referred to as distributed power supply 104) are current power supplies that do not have the ability to maintain the system voltage but read the phase of the system voltage and control the current flowing in and out while following the phase, and may be storage battery systems, solar power generation systems, or wind power generation systems. In the configuration according to Embodiment 1, there may be a plurality of distributed power supplies 104*a* to 104*g*, or there may be no distributed power supplies.

Transformers 105*a* to 105*j* (hereinafter, also collectively referred to as transformer 105) are interconnected transformers installed between voltage power supplies 103*a* to 103*c*, distributed power supplies 104*a* to 104*g* and the power transmission and distribution network.

Switches 106*a* to 106*j* (hereinafter, also collectively referred to as switch 106) are power switches that determine the connection state between voltage power supplies 103*a* to 103*c*, distributed power supplies 104*a* to 104*g* and the power transmission and distribution network within power generation and transformation facilities 102*a* to 102*c*. All of the components described as switches may also be circuit breakers.

Switches 107*a* to 107*c* (hereinafter, also collectively referred to as switch 107) are section switches that determine the connection state between power generation and transformation facilities 102*a* to 102*c* and the power transmission and distribution network. In the configuration according to Embodiment 1, it is desirable that switches 107*a* to 107*c* have a synchronous turn-on function. The synchronous turn-on function refers to a function that, when a switch is turned on from the disconnected state, suppresses an inrush current due to the difference in voltage between the opposite ends of the switch in turn-on of the switch by operating the switch such that the switch is allowed to be turned on only when certain conditions regarding the differences in amplitude, phase, and frequency of the voltage at the opposite ends are met, with the voltages supplied by different voltage power supplies being respectively applied to the opposite ends of the switch.

Switches 108*a* to 108*f* (hereinafter, also collectively referred to as switch 108) are section switches installed to divide and manage the power transmission and distribution network of the isolated power grid.

Transformers 109*a* to 109*f* (hereinafter, also collectively referred to as transformer 109) are installed to enable consumers to receive voltage from the power transmission and distribution network, which may be the pole transformers generally installed in the power distribution network or the receiving transformers installed by high-voltage consumers on their premises. One transformer is shown per power distribution section in FIG. 1, but there may be a plurality of transformers within one power distribution section, or there may be no transformers.

A step voltage regulator (SVR) 110 is an automatic voltage regulator, which is a single-winding transformer that adjusts voltage in accordance with the current flow state by switching between a plurality of taps having different transformation ratios.

A switch 111 determines the connection state between the isolated power grid and the main grid, and is always disconnected when an isolated operation is performed, and is connected when an interconnected operation with the main grid is performed.

The procedure for starting up the isolated power grid from a power failure state according to the embodiment will be described with reference to FIG. 1.

First, the grids inside power generation and transformation facilities 102*a* to 102*c* are started up to the operation state. Description will be given with regard to the premise of power generation and transformation facility 102*a* by way of example. During start-up of the premise of power generation and transformation facility 102*a*, switch 107*a* is brought to the disconnected state to be isolated from the power transmission and distribution network. Voltage power supply 103*a* is activated to output a voltage. At this time, in order to avoid the occurrence of an exciting inrush current due to sudden application of voltage to transformer 105*a* connected to the output end of voltage power supply 103*a*, voltage power supply 103*a* may perform soft start. The soft start refers to an activation method of gradually increasing the amplitude of the output AC voltage of the voltage power supply from zero to the rated voltage over about several seconds to several minutes in a ramp manner or stepwise, thereby avoiding a sudden change in output voltage. When switches 106*a* to 106*d* are turned on after voltage power supply 103*a* has been started up, voltage may be suddenly applied to transformers 105*b* to 105*d* to cause an exciting inrush current. In order to avoid such a situation, switches 106*a* to 106*d* may be turned on before the soft start of voltage power supply 103*a*. This allows the voltage applied to transformers 105*b* to 105*d* to change gradually, resulting in the effect of suppressing the occurrence of an exciting inrush current. After the output voltage of voltage power supply 103*a* has risen to the rated voltage and stabilized, each of the interconnection operations of distributed power supplies 104*a* to 104*c* may be started as necessary, or may not be started. Consequently, start-up of the grid within the premise of power generation and transformation facility 102*a* is complete. Similarly, the grids in power generation and transformation facilities 102*b* and 102*c* can be started up.

Second, section switches 107*a* to 107*c* and 108*a* to 108*f* are sequentially turned on. The section to which voltage is supplied will be expanded.

The embodiment will describe the method of determining and distributing the turn-on sequence of section switches in this step in isolated power grid management device 101.

In general, when there is a section to which a new voltage is applied due to turn-on of a section switch, voltage is applied suddenly to a transformer connected to the section when the switch is turned on, and thus, an exciting inrush current may occur. The amount of exciting inrush current that occurs varies depending on the phase of the voltage at the moment of application, the residual magnetic flux of the transformer, the excitation characteristics of the transformer, or the like, and under the worst conditions, a current about several times to over ten times the rated capacity of the transformer will flow in. This exciting inrush current is supplied, while being shared, by all voltage power supplies electrically connected to the transformer, but if the current borne by a voltage power supply is excessively large relative to the capacity of the voltage power supply, the overcurrent protection of the voltage power supply may be shut down, or an instantaneous voltage drop may occur that deviates from the quality standard. Thus, the embodiment provides a method of determining a turn-on sequence of section switches that allows the voltage power supply to supply an exciting inrush current generated in the transformer in turn-on of the section switch, with a margin as wide as possible. More specifically, the turn-on sequence of section switches is determined such that the total capacity value of the voltage power supply that will supply the exciting inrush current is greater than the total value of the rated capacity of the transformer in which the exciting inrush current may be generated by turning on the section switch. Such a method of determining the turn-on sequence of section switches will be described below in more detail.

Figure 2:
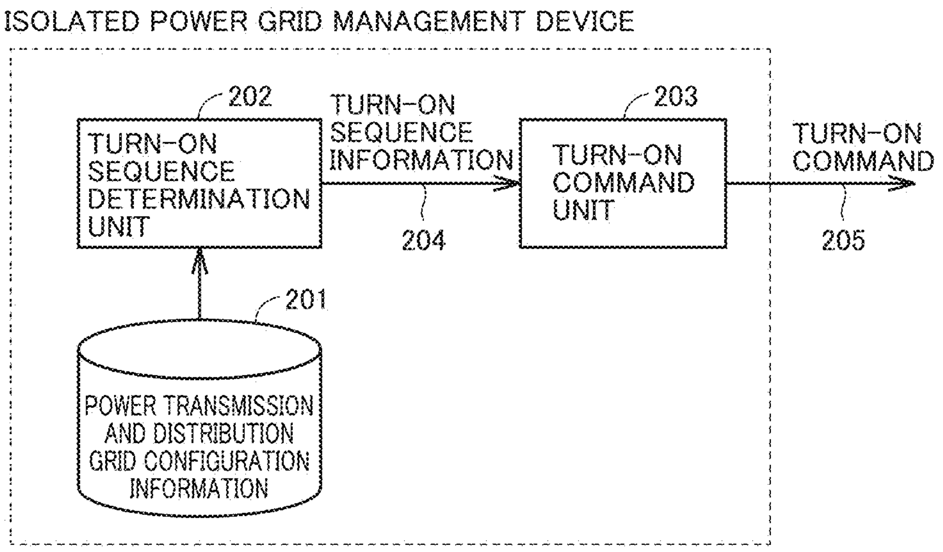
FIG. 2 shows an internal configuration of an isolated power grid management device 101 according to the embodiment.

FIG. 2 shows an internal configuration of isolated power grid management device 101 according to the embodiment. The configuration and operation of isolated power grid management device 101 will be described with reference to FIG. 2.

Power transmission and distribution grid configuration information 201 includes path information of a power transmission and distribution grid, and information on the installation position of each section switch, the connection position and capacity of a transformer connected to each section, and the installation position and capacity of each voltage power supply.

Isolated power grid management device 101 includes, as an example, a storage unit provided internally, and power transmission and distribution grid configuration information 201 may be stored in the storage unit or may be stored in an external storage medium and invoked as necessary.

A turn-on sequence determination unit 202 determines the turn-on sequence of each section switch installed in the power transmission and distribution network at least based on power transmission and distribution grid configuration information 201, and transmits the turn-on sequence as turn-on sequence information 204 to a turn-on command unit 203.

Turn-on command unit 203 transmits a turn-on command 205 to each section switch based on the input turn-on sequence information 204. Turn-on command 205 may be transmitted via an electrical communication line or may be transmitted via wireless communication. Alternatively, transmission may be performed via a device that relays a command on the route until arrival of the command to a section switch, or via a different management device that performs different processing.

It goes without saying that, in addition to the above-mentioned components, isolated power grid management device 101 may also include, in parallel, a portion that performs processing different from that described in the present disclosure, such as processing of determining a power value to be output and operation/stop of each distributed power supply connected to an isolated power grid and transmitting an output power command value and an operation/stop command to each power supply.

Figure 3:
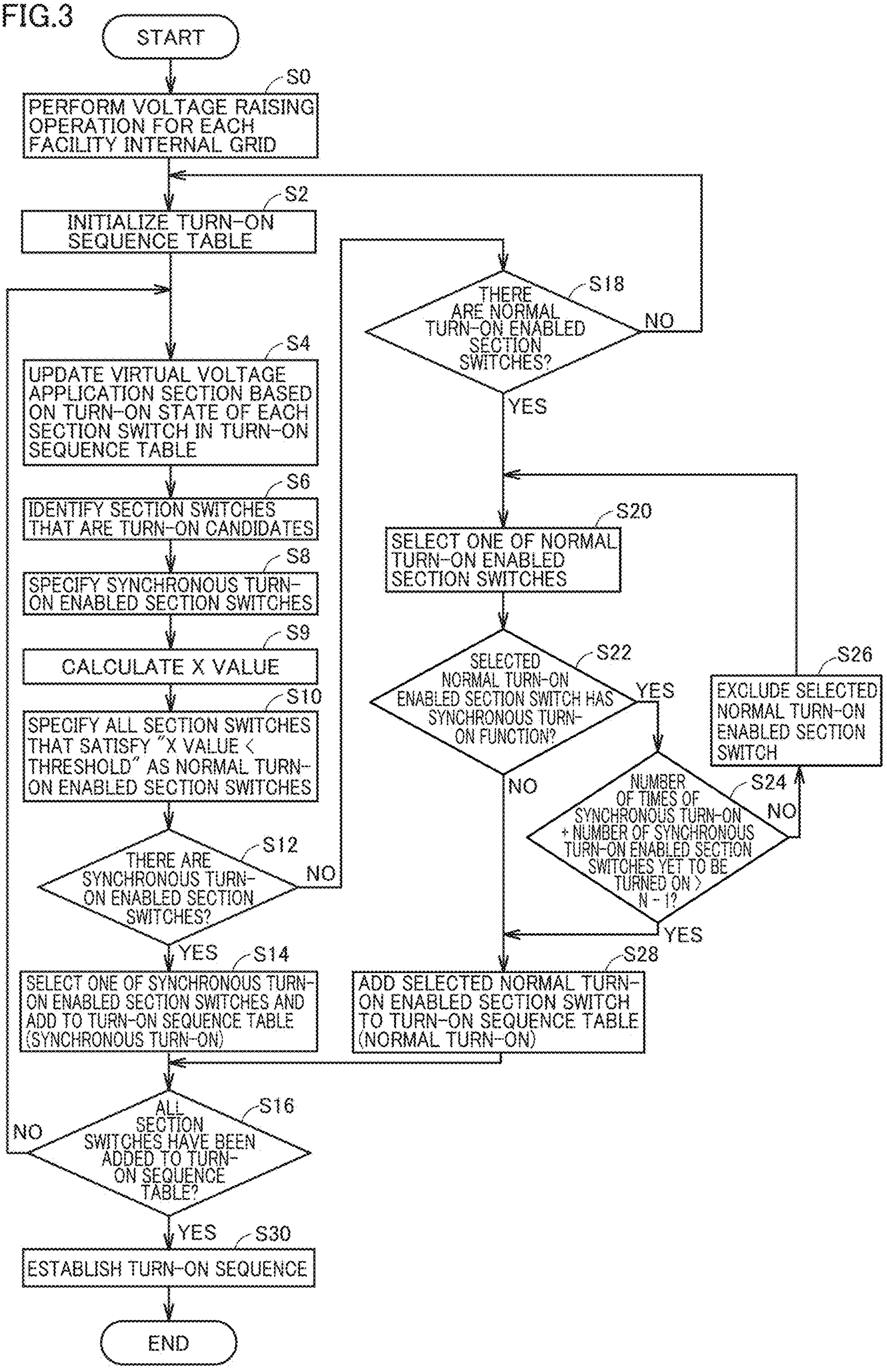
FIG. 3 is a flowchart illustrating a determination sequence in determination of a turn-on sequence of section switches in a turn-on sequence determination unit 202 according to the embodiment.

FIG. 3 is a flowchart illustrating a determination sequence in determination of a turn-on sequence of section switches in turn-on sequence determination unit 202 according to the embodiment.

A specific method of determining a turn-on sequence will be described with reference to FIG. 3.

In the following description, "normal turn-on" refers to turning on a section switch yet to be turned on with a voltage applied on only one side and no voltage applied on the other side. "Synchronous turn-on" refers to turning on a section switch yet to be turned on with a voltage applied on opposite sides, while checking synchronization of the amplitude, phase, and the like of the voltage between the opposite terminals.

First, description will be given with regard to the rules in determination of a turn-on sequence of section switches, which are assumed as the background of the determination sequence in FIG. 3.

In the present embodiment, the effect of preventing shutdown of overcurrent protection of a voltage power supply and an excessive drop in instantaneous voltage due to an exciting inrush current to a transformer is obtained by determining the turn-on sequence of section switches such that the following rules are complied with.

Rules R1 to R5 are established in determination of a turn-on sequence of section switches.

Rule R1: A switch with no voltage applied on opposite sides is not turned on.

Rule R2: When turning on a switch with a voltage applied on only one side and no voltage applied on the other side, the switch is turned on only if "X value<certain threshold" is satisfied.

Rule R3: When turning on a switch with a voltage applied on opposite sides, synchronous turn-on is performed.

Rule R4: When the sum of "the number of times synchronous turn-on has already been performed" and "the number of switches yet to be turned on that have the synchronous turn-on function" is equal to "the number (N) of voltage power supplies included in the isolated power grid−1", normal turn-on of a switch yet to be turned on that has the synchronous turn-on function is prohibited.

Rule R5: When there are both a synchronous turn-on enabled switch and a normal turn-on enabled switch, the synchronous turn-on enabled switch is turned on preferentially.

Herein, the X value is a value obtained by dividing the total capacity value of the group of transformers included in the power transmission and distribution section to which a voltage is newly applied through turn-on of a target section switch by the total capacity value of the voltage power supplies that have already been electrically connected to the section switch.

The purpose for setting the above rules and the effects thereof will be described.

(1) Rule R1

First, turning on a section switch with no voltage applied on opposite sides does not expand a power supply section. Also, the range in which a voltage is newly applied simultaneously becomes wider when any other section switch is normally turned on in a subsequent step, and accordingly, the number of transformers to which a voltage is applied at once increases, which may be disadvantageous in terms of the amount of exciting inrush current generated. Rule R1 is a restriction to avoid this situation.

(2) Rule R2

Rule R2 is an element that is characteristic of the present disclosure. When a section switch is normally turned on, a voltage is newly applied to the transformer to cause an exciting inrush current, which is supplied by the voltage power supply. In general, the amount of exciting inrush current generated in a transformer is proportional to the rated capacity of the transformer, provided that the voltage phase, residual magnetic flux, and excitation characteristics are the same. In addition, when an exciting inrush current occurs simultaneously in a plurality of transformers connected in parallel, the total value thereof will be supplied by the power supply. On the other hand, all power supplies have a limit for the current they can supply, and in order to avoid a device failure when the limit is reached, it is common to set a certain withstand overcurrent and stop the device for protection when the withstand overcurrent is exceeded. The withstand overcurrent of a voltage power supply varies greatly depending on whether the voltage power supply is a rotating machine power supply or an inverter power supply, but in the case of the same type of power supply, the withstand overcurrent is proportional to the rated capacity. If there are a plurality of voltage power supplies in parallel, the voltage power supplies supply, while sharing, the current in accordance with the ratio of their rated capacities, the impedance ratio of the power distribution lines, or the like. Thus, as the X value, that is, the value obtained by dividing the total capacity value of the group of transformers, to which a voltage is newly applied, by the total capacity value of the voltage power supplies, is smaller, shutdown of overcurrent protection is reached less easily and a voltage drop occurs less easily, because each voltage power supply can supply a current with a margin against its own rating. Thus, the effect of preventing shutdown of overcurrent protection of a voltage power supply and preventing an excessive voltage drop can be achieved by putting such a restriction as to normally turn on only a section switch having an X value smaller than a certain threshold. The threshold is desirably determined in advance. As described above, since the amount of exciting inrush current generated in the transformer varies depending on the voltage phase, residual magnetic flux, and excitation characteristics, it is desirable to assume the most severe conditions and then derive in advance, by theoretical calculation or by simulation, such an upper limit of the X value as to cause the current supplied by the voltage power supply to fall within the allowable range and cause the amount of voltage drop to fall within the allowable range even under these conditions, and set this upper value as the threshold.

(3) Rule R3

Rule R3 puts a restriction such that synchronous turn-on is performed whenever the paths of voltages supplied by different voltage power supplies meet. When a switch yet to be turned on is turned on with greatly different voltages being applied at opposite ends of the switch, an inrush current or sudden voltage fluctuations will occur, and accordingly, this rule reflects execution of synchronous turn-on as a countermeasure against this situation.

(4) Rule R4

Rule R4 is a restriction that takes into account the fact that synchronous turn-on can only be performed in a section switch having the synchronous turn-on function, in satisfying rule R3. If synchronous turn-on is performed whenever the electrical paths connected from different voltage power supplies meet, in order to complete the connection of all sections of an isolated power grid including N number of voltage power supplies, it is necessary to perform synchronous turn-on N−1 times in total. However, since synchronous turn-on can only be performed using a section switch having the synchronous turn-on function, in any aspect, "(the number of times synchronous turn-on has already been performed)+(the number of section switches yet to be turned on that have the synchronous turn-on function)≥(N−1)" needs to be satisfied.

When the above-described condition is not satisfied, the number of times of synchronous turn-on becomes insufficient, and accordingly, the connection of all the sections cannot be completed.

In order to satisfy this in any aspect, taking into account that (the number of switches yet to be turned on that have the synchronous turn-on function) reduces by one when section switches that have the synchronous turn-on function are normally turned on, it is only required to prohibit normal turn-on of the switch having the synchronous turn-on function if (the number of times synchronous turn-on has been performed)+(the number of section switches yet to be turned on that have the synchronous turn-on function)=N−1.

Rule R4 has the effect of preventing occurrence of an aspect in which rule R3 cannot be satisfied.

(5) Rule R5

As long as Rule R2 exists, it is desirable to determine the turn-on sequence such that the X value becomes smaller. In order to make the X value smaller, since the total capacity value of transformers present in a given section has already been determined by the facility configuration, it is desirable to increase the total capacity value of the voltage power supplies that supply an exciting inrush current. In other words, a state in which a plurality of voltage power supplies are connected in parallel is desirably secured first. Since performing synchronous turn-on is equivalent to connecting different voltage power supplies in parallel, preferentially performing synchronous turn-on over normal turn-on has the effect of reducing the X value.

FIG. 3 shows the sequence for determining a turn-on sequence of switches that complies with the above rules R1 to R5.

Turn-on sequence determination unit 202 performs a voltage raising operation for each facility internal grid (step S0). The present embodiment will describe the case where the voltage raising operation for each facility internal grid is performed, but the raising operation may be actually performed after determination of the turn-on sequence of switches.

Subsequently, turn-on sequence determination unit 202 initializes a turn-on sequence table (step S2). Herein, the turn-on sequence table is a table in which the turn-on sequence of section switches is arranged in order from the beginning, and the contents are added and deleted each time processing is performed.

Subsequently, turn-on sequence determination unit 202 updates a virtual voltage application section based on the turn-on state of each section switch in the turn-on sequence table (step S4). Turn-on sequence determination unit 202 checks which section in the power transmission and distribution network a voltage has been applied, referring to information on whether each section switch has been turned on or yet to be turned on in the contents of the turn-on sequence table at the present time, and then updates the virtual voltage application section.

Subsequently, turn-on sequence determination unit 202 identifies the section switches that are turn-on candidates in accordance with the updated voltage application section (step S6). Specifically, turn-on sequence determination unit 202 identifies all the section switches yet to be turned on with a voltage being applied on at least one side, and specifies those as the section switches that are turn-on candidates. Rule R1 is complied with by selecting the section switches to be turned on from among the section switches that are turn-on candidates in this way.

Subsequently, turn-on sequence determination unit 202 specifies synchronous turn-on enabled section switches from among the identified section switches that are turn-on candidates (step S8). Specifically, turn-on sequence determination unit 202 specifies the section switches with a voltage applied on the opposite sides that have the synchronous turn-on function from among the section switches that are turn-on candidates. Rule R3 is complied with by selecting the section switches that are subjected to synchronous turn-on from among the synchronous turn-on enabled section switches.

Subsequently, turn-on sequence determination unit 202 calculates an X value (step S9). The X value is a value obtained by dividing the total capacity value of the group of transformers included in the power transmission and distribution section, to which a voltage is newly applied through turn-on of a target section switch, by the total capacity value of the voltage power supplies that have already been electrically connected to the section switch.

Subsequently, turn-on sequence determination unit 202 specifies all section switches that satisfy "X value<threshold" as normal turn-on enabled section switches (step S10). Specifically, turn-on sequence determination unit 202 specifies all section switches with a voltage applied on only one side that satisfy "X value<threshold" as normal turn-on enabled section switches from among the section switches that are turn-on candidates. Rule R2 is complied with by selecting a section switch that is subjected to normal turn-on from among the normal turn-on enabled section switches.

Subsequently, turn-on sequence determination unit 202 determines whether or not there are synchronous turn-on enabled section switches (step S12).

When determining in step S12 that there are synchronous turn-on enabled section switches (YES in step S12), turn-on sequence determination unit 202 selects one of the synchronous turn-on enabled section switches and adds the selected one to the turn-on sequence table (synchronous turn-on). When selecting any one of the synchronous turn-on enabled section switches, selection may be randomly made from among all the synchronous turn-on enabled section switches, or selection may be made in accordance with some rule, for example, in an ascending order of management numbers.

Subsequently, in step S16, turn-on sequence determination unit 202 determines whether or not all the section switches have been added to the turn-on sequence table (step S16).

When determining in step S16 that all the section switches have been added to the turn-on sequence table (YES in step S16), turn-on sequence determination unit 202 establishes the turn-on sequence (step S30). After the turn-on sequence of all the section switches has been determined, a turn-on command is actually output. This is because, in an aspect, due to the fact that a certain section switch has been turned on first, there are no section switches that can be turned on even though there are section switches yet to be turned on in the subsequent steps, requiring a return to the previous state. In other words, turn-on sequence determination unit 202 generates a turn-on sequence table, from which turn-on of all section switches can be completed is checked, and then, outputs the established turn-on sequence table to turn-on command unit 203.

Then, turn-on sequence determination unit 202 ends the process. In other words, the established turn-on sequence table is output to turn-on command unit 203 as turn-on sequence information 204.

In contrast, when determining in step S16 that not all the section switches have been added to the turn-on sequence table (NO in step S16), turn-on sequence determination unit 202 returns to step S4 and repeats the above process until all section switches have been added to the turn-on sequence table.

In contrast, when determining in step S12 that there are no synchronous turn-on enabled section switches (NO in step S12), turn-on sequence determination unit 202 determines whether or not there are normal turn-on enabled section switches (step S18).

When determining in step S18 that there are no normal turn-on enabled section switches (NO in step S18), turn-on sequence determination unit 202 returns to step S2. In other words, turn-on sequence determination unit 202 initializes the turn-on sequence table.

In other words, if there are neither synchronous turn-on enabled section switches nor normal turn-on enabled section switches, the process returns to step S2 because the turn-on sequence is not appropriate. Turn-on sequence determination unit 202 may perform control to store in advance the list of the turn-on sequence table before initialization for avoiding repeating the same process, and then make a specification to exclude this sequence. In other words, if there are no section switches that can be turned on even though there are section switches yet to be turned on, the determination will be restarted from the beginning. In this way, the determination can be repeated until the turn-on sequence of all section switches is determined.

When determining in step S18 that there are normal turn-on enabled section switches (YES in step S18), turn-on sequence determination unit 202 selects one of the normal turn-on enabled section switches (step S20). When selecting any one of the normal turn-on enabled section switches, turn-on sequence determination unit 202 may randomly select one from among all the normal turn-on enabled section switches or may select one in accordance with some rule, for example, in an ascending order of management numbers.

Subsequently, turn-on sequence determination unit 202 determines whether or not the selected normal turn-on enabled section switch has the synchronous turn-on function (step S22).

When determining in step S22 that the selected normal turn-on enabled section switch does not have the synchronous turn-on function (NO in step S22), turn-on sequence determination unit 202 adds the selected normal turn-on enabled section switch to the turn-on sequence table (normal turn-on) (step S28).

Then, the process proceeds to step S16. The subsequent process is the same.

In contrast, when determining in step S22 that the selected normal turn-on enabled section switch has the synchronous turn-on function (YES in step S22), synchronous turn-on sequence determination unit 202 determines whether or not the condition "the number of times of synchronous turn-on+the number of synchronous turn-on enabled section switches yet to be turned on>N−1" is satisfied (step S24).

When determining in step S24 that the condition "the number of times of synchronous turn-on+the number of synchronous turn-on enabled section switches yet to be turned on>N−1" is satisfied (YES in step S24), turn-on sequence determination unit 202 proceeds to step S28 and adds the selected normal turn-on enabled section switch to the turn-on sequence table (normal turn-on). The subsequent process is the same.

In contrast, when determining in step S24 that the condition "the number of times of synchronous turn-on+the number of synchronous turn-on enabled section switches yet to be turned on>N−1" is not satisfied (NO in step S24), turn-on sequence determination unit 202 proceeds to step S26.

In step S26, turn-on sequence determination unit 202 excludes the selected normal turn-on enabled section switch. Turn-on sequence determination unit 202 then returns to step S20 and repeats the above process.

In other words, turn-on sequence determination unit 202 allows normal turn-on of the selected section switch when the number of times of synchronous+the number of synchronous turn-on enabled section switches yet to be turned on>N−1, and when the number of times of synchronous turn-on+the number of synchronous turn-on enabled section switches yet to be turned on=N−1, excludes the selected section switch from the normal turn-on enabled section switches and performs processing of step S20 again. This can prevent shortage of the number of section switches having the synchronous turn-on function, and thus, rules R3 and R4 can be complied with.

FIG. 4 is a diagram (1) illustrating a flow of the determination of the turn-on sequence by turn-on sequence determination unit 202 according to the embodiment. In this description, section switches 107*a* to 107*c* have the synchronous turn-on function, and section switches 108*a* to 108*f* do not have the synchronous turn-on function.

In step S0, turn-on sequence determination unit 202 performs the voltage raising operation for each facility internal grid. Consequently, a voltage is applied to section switches 107*a*, 107*b*, 107*c* on one side.

Subsequently, in step S2, turn-on sequence determination unit 202 initializes the turn-on sequence table. In step S4, turn-on sequence determination unit 202 updates the virtual voltage application section.

Referring to FIG. 4(A), the case is shown where there are no synchronous turn-on enabled section switches, and section switches 107*a*, 107*b*, 107*c* are normal turn-on candidates. Section switches 107*a*, 107*b*, 107*c* satisfy "X value<threshold". Then, in step S20, normal turn-on enabled section switch 107*b* is selected.

In this case, the selected section switch 107*b* has the synchronous turn-on function, and thus, the process proceeds to step S24.

Then, in step S24, the selected section switch 107*b* is added to the turn-on sequence table (normal turn-on) because the condition "the number of times of synchronous turn-on+the number of synchronous turn-on enabled section switches yet to be turned on>N−1" is satisfied. The process then returns to step S4 again.

Then, section switch 107*b* is turned on, and accordingly, turn-on sequence determination unit 202 updates the virtual voltage application section.

Referring to FIG. 4(B), the case is shown where there are no synchronous turn-on enabled section switches, and section switches 107*a*, 107*c*, 108*c* are normal turn-on candidates. Section switches 107*a*, 107*b*, 108*c* satisfy “X value<threshold”.

Then, in step S20, normal turn-on enabled section switch 107*a* is selected.

In this case, the selected section switch 107*a* has the synchronous turn-on function, and thus, the process proceeds to step S24.

Then, in step S24, the selected section switch 107*a* is excluded from the normal turn-on enabled section switches because the condition “the number of times of synchronous turn-on+the number of synchronous turn-on enabled section switches yet to be turned on>N−1” is not satisfied. Then, the process proceeds to step S20.

Then, again in step S20, normal turn-on enabled section switch 107*c* is selected.

In this case, the selected section switch 107*c* has the synchronous turn-on function, and thus, the process proceeds to step S24.

Then, in step S24, the selected section switch 107*c* is excluded from normal turn-on enabled section switches because the condition “the number of times of synchronous turn-on+the number of synchronous turn-on enabled section switches yet to be turned on>N−1” is not satisfied. Then, the process proceeds to step S20.

Then, again in step S20, normal turn-on enabled section switch 108*c* is selected.

In this case, the selected section switch 108*c* does not have the synchronous turn-on function, and thus, the process proceeds to step S28.

Section switch 108*c* is added to the turn-on sequence table (normal turn-on). The process then returns to step S4 again.

Then, section switch 108*c* is turned on, and accordingly, turn-on sequence determination unit 202 updates the virtual voltage application section.

Referring to FIG. 4(C), the case is shown where there are no synchronous turn-on enabled section switches, and section switches 107*a*, 107*c*, 108*b*, 108*f* are normal turn-on candidates. Section switches 107*a*, 107*c*, 108*b*, 108*f* satisfy “X value<threshold”. In contrast, section switch 108*e* does not satisfy “X value<threshold”.

Then, in step S20, normal turn-on enabled section switch 108*f* is selected.

In this case, the selected section switch 108*f* does not have the synchronous turn-on function, and thus, the process proceeds to step S28.

Section switch 108*f* is added to the turn-on sequence table (normal turn-on). The process then returns to step S4 again.

Then, section switch 108*f* is turned on, and accordingly, turn-on sequence determination unit 202 updates the virtual voltage application section.

Referring to FIG. 4(D), the case is shown where synchronous turn-on enabled section switch 107*c* and section switches 107*a*, 108*b* are normal turn-on candidates. Section switches 107*a*, 108*b* satisfy “X value<threshold”.

In this case, because there is synchronous turn-on enabled section switch 107*c* in step S12, section switch 107*c* is added to the turn-on sequence table (synchronous turn-on). The process then returns to step S4 again.

Then, section switch 107*c* is turned on, and accordingly, turn-on sequence determination unit 202 updates the virtual voltage application section.

Referring to FIG. 4(E), the case is shown where there are no synchronous turn-on enabled section switches, and section switches 107*a*, 108*b* are normal turn-on candidates. Section switches 107*a*, 108*b* satisfy “X value<threshold”. In contrast, section switch 108*e* does not satisfy “X value<threshold”.

Then, in step S20, normal turn-on enabled section switch 108*b* is selected.

In this case, the selected section switch 108*b* does not have the synchronous turn-on function, and thus, the process proceeds to step S28.

Section switch 108*b* is added to the turn-on sequence table (normal turn-on). The process then returns to step S4 again.

Then, section switch 108*b* is turned on, and accordingly, turn-on sequence determination unit 202 updates the virtual voltage application section.

Referring to FIG. 4(F), the case is shown where there are no synchronous turn-on enabled section switches, and section switches 107*a*, 108*a* are normal turn-on candidates. Section switches 107*a*, 108*a* satisfy “X value<threshold”. In contrast, section switch 108*e* does not to satisfy “X value<threshold”.

Then, in step S20, normal turn-on enabled section switch 108*a* is selected.

In this case, the selected section switch 108*a* does not have the synchronous turn-on function, and thus, the process proceeds to step S28.

Section switch 108*a* is added to the turn-on sequence table (normal turn-on). The process then returns to step S4 again.

Then, section switch 108*a* is turned on, and accordingly, turn-on sequence determination unit 202 updates the virtual voltage application section.

FIG. 5 is a diagram (2) illustrating a flow of determination of the turn-on sequence by turn-on sequence determination unit 202 according to the embodiment.

Referring to FIG. 5(A), the case is shown where there is synchronous turn-on enabled section switch 107*a*. Section switch 107*a* satisfies “X value<threshold”. In contrast, section switch 108*e* does not satisfy “X value<threshold”.

In this case, since there is synchronous turn-on enabled section switch 107*a* in step S12, section switch 107*a* is added to the turn-on sequence table (synchronous turn-on). The process then returns to step S4 again.

Then, section switch 107*a* is turned on, and accordingly, turn-on sequence determination unit 202 updates the virtual voltage application section.

Referring to FIG. 5(B), the case is shown where there are no synchronous turn-on enabled section switches, and section switch 108*e* is a normal turn-on candidate. Section switch 108*e* satisfies “X value<threshold”.

Then, in step S20, normal turn-on enabled section switch 108*e* is selected.

In this case, the selected section switch 108*e* does not have the synchronous turn-on function, and thus, the process proceeds to step S28.

Section switch 108*e* is added to the turn-on sequence table (normal turn-on). The process then returns to step S4 again.

Then, section switch 108*e* is turned on, and accordingly, turn-on sequence determination unit 202 updates the virtual voltage application section.

Referring to FIG. 5(C), the case is shown where there are no synchronous turn-on enabled section switches, and section switch 108*d* is a normal turn-on candidate. Section switch 108*d* satisfies “X value<threshold”.

Then, in step S20, normal turn-on enabled section switch 108*d* is selected.

In this case, the selected section switch 108*d* does not have the synchronous turn-on function, and thus, the process proceeds to step S28.

Section switch 108*d* is added to the turn-on sequence table (normal turn-on).

As a result, as shown in FIG. 5(D), all the section switches are added to the turn-on sequence table. This completes the process.

FIG. 6 is a diagram illustrating an example turn-on sequence table according to the embodiment.

Referring to FIG. 6, section switch 107*b* (normal turn-on) is added as the first of the turn-on sequence; section switch 108*c* (normal turn-on), the second; section switch 108*f* (normal turn-on), the third; section switch 107*c* (synchronous turn-on), the fourth; section switch 108*b* (normal turn-on), the fifth; section switch 108*a* (normal turn-on), the sixth; section switch 107*a* (synchronous turn-on), the seventh; section switch 108*e* (normal turn-on), the eighth; and section switch 108*d* (normal turn-on), the ninth. This turn-on sequence table is merely an example, and the turn-on sequence can also be based on any other combination according to the above flow.

The isolated power grid management device that manages the turn-on sequence of section switches according to the method of determining the turn-on sequence of section switches described above can achieve the effect of preventing the occurrence of shutdown of overcurrent protection of a voltage power supply that supplies an exciting inrush current that flows into a transformer when a section switch is turned on, and preventing an excessive drop in instantaneous voltage of a power transmission and distribution grid, when starting up the isolated power grid from a power failure state.

A case where, no matter how a selection is made again, section switches that can be turned on will not exist even though there are section switches yet to be turned on, means that, in the first place, the capacity of a voltage power supply is insufficient relative to the capacity of a transformer present in the power transmission and distribution section, and accordingly, it is necessary to enhance a power supply or add a switch. Such a case is not to be managed in the present disclosure.

In the above embodiment, a section switch having an X value smaller than a threshold is turned on preferentially, but the present disclosure is not limited thereto. When there is a power transmission and distribution section to which a voltage is newly applied by turning on any of the section switches yet to be turned on, the priority order of turning on section switches may be determined by any other method using the total capacity value of the group of transformers included in the power transmission and distribution section and information on the total capacity value of the voltage power supplies that have already been electrically connected to this section switch. For example, the turn-on priority order may be determined based on the fact that the difference obtained by subtracting the total capacity value of the group of transformers included in the power transmission and distribution section from the total capacity value of the voltage power supplies that have already been electrically connected to the section switch is greater than a certain threshold.

The embodiment disclosed herein should be considered to be illustrative in all respects and not restrictive. Further, it goes without saying that there is no problem with suitably combining a plurality of embodiments, and it is desirable to further enhance the effects of the respective embodiments for efficient and economical use.

It is intended that the scope of the present disclosure is defined by claims, not by the above description, and encompasses all modifications and variations equivalent in meaning and scope to the claims.

REFERENCE SIGNS LIST

101 isolated power grid management device; 102, 102*a*, 102*b*, 102*c* transformer facility; 103, 103*a*, 103*b*, 103*c* voltage power supply; 104, 104*a*, 104*c*, 104*g* distributed power supply; 107*a*, 107*b*, 107*c*, 108*a*, 108*b*, 108*c*, 108*d*, 108*e*, 108*f* section switch; 201 power transmission and distribution grid configuration information; 202 turn-on sequence determination unit; 203 turn-on command unit.

The invention claimed is:

1. An isolated power grid management device that manages an operation state of an isolated power grid disconnected from a main power grid and operated independently, the isolated power grid including one or more voltage power supplies to function to maintain a system voltage, and a plurality of section switches to determine a connection state with a power transmission and distribution network and divide the power transmission and distribution network, the power transmission and distribution network forming a network electrically connecting the voltage power supply to each consumer, the isolated power grid management device comprising:

a turn-on sequence determination unit to determine, based on path information of the power transmission and distribution network, capacity information of a transformer included in each power transmission and distribution section, and capacity information of each voltage power supply, a turn-on sequence of the plurality of section switches in recovery of the isolated power grid from a power failure state; and a turn-on command unit to provide a turn-on command to the plurality of section switches in accordance with a sequence determined by the turn-on sequence determination unit, wherein when there is a power transmission and distribution section to which a voltage is newly applied by turning on a section switch of section switches yet to be turned on, the turn-on sequence determination unit determines a turn-on priority order of the section switch based on a total capacity value of a group of transformers included in the power transmission and distribution section and information on a total capacity value of a voltage power supply that has already been electrically connected to the section switch.

2. The isolated power grid management device according to claim 1, wherein when there is a power transmission and distribution section to which a voltage is newly applied by turning on a section switch of section switches yet to be turned on, the turn-on sequence determination unit determines a turn-on sequence such that a normal turn-on enabled section switch is turned on first over any other section switch, the normal turn-on enabled section switch being a section switch having a value smaller than a predetermined threshold, the value being obtained by dividing a total capacity value of a group of transformers included in the power transmission and distribution section by a total capacity value of the voltage power supply that has already been electrically connected to the section switch.

3. The isolated power grid management device according to claim 2, wherein the turn-on sequence determination unit determines a turn-on sequence so as to turn on a synchronous turn-on enabled switch first over any other section switch among section switches yet to be turned on, the synchronous turn-on enabled switch being a section switch having a synchronous turn-on function with a voltage applied between opposite terminals thereof.

4. The isolated power grid management device according to claim 3, wherein the turn-on sequence determination unit determines a turn-on sequence so as to first turn on the synchronous turn-on enabled switch when there are the synchronous turn-on enabled switch and the normal turn-on enabled section switch.

5. The isolated power grid management device according to claim 1, wherein the isolated power grid includes at least two or more voltage power supplies, and the turn-on sequence determination unit determines a turn-on sequence such that, when a path electrically connected from any voltage power supply and a path electrically connected from any different voltage power supply are connected to each other by turning on a section switch, the section switch is a section switch having a synchronous turn-on function.

6. The isolated power grid management device according to claim 5, wherein the turn-on sequence determination unit determines a turn-on sequence such that, among switches having a synchronous turn-on function that are included in the isolated power grid, a number of switches perform synchronous turn-on, the number being equal to a number obtained by subtracting one from a total number of voltage power supplies included in the isolated power grid.

7. The isolated power grid management device according to claim 1, wherein the voltage power supply is an inverter power supply to perform control imitating operation characteristics of a synchronous generator.

8. An isolated power grid system comprising:

an isolated power grid disconnected from a main power grid and operated independently; and an isolated power grid management device to manage an operation state of the isolated power grid, wherein the isolated power grid includes one or more voltage power supplies to function to maintain a system voltage, and a plurality of section switches to determine a connection state with a power transmission and distribution network and divide the power transmission and distribution network, the power transmission and distribution network forming a network electrically connecting the voltage power supply to each consumer, the isolated power grid management device includes:

a turn-on sequence determination unit to determine, based on path information of the power transmission and distribution network, capacity information of a transformer included in each power transmission and distribution section, and capacity information of each voltage power supply, a turn-on sequence of the plurality of section switches in recovery of the isolated power grid from a power failure state; and a turn-on command unit to provide a turn-on command to the plurality of section switches in accordance with a sequence determined by the turn-on sequence determination unit, and when there is a power transmission and distribution section to which a voltage is newly applied by turning on a section switch of section switches yet to be turned on, the turn-on sequence determination unit determines a turn-on priority order of the section switch based on a total capacity value of a group of transformers included in the power transmission and distribution section and information on a total capacity value of a voltage power supply that has already been electrically connected to the section switch.

* * * * *